(12) United States Patent
Nimura

(10) Patent No.: US 8,711,480 B2
(45) Date of Patent: Apr. 29, 2014

(54) FILM, POLARIZING PLATE AND DISPLAY DEVICE, AND METHOD OF MANUFACTURING FILM

(75) Inventor: Shigeaki Nimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 92 days.

(21) Appl. No.: 13/427,480

(22) Filed: Mar. 22, 2012

(65) Prior Publication Data

US 2012/0262786 A1 Oct. 18, 2012

(30) Foreign Application Priority Data

Apr. 12, 2011 (JP) ................... 2011-088145

(51) Int. Cl.
*G02B 5/30* (2006.01)
(52) U.S. Cl.
USPC ................... 359/489.06; 359/489.11
(58) Field of Classification Search
USPC ............ 359/489.06, 489.08, 489.11
See application file for complete search history.

(56) References Cited

U.S. PATENT DOCUMENTS

| 7,551,250 B2* | 6/2009 | Okumura ................ 349/117 |
| 2002/0130997 A1* | 9/2002 | Yano et al. ................ 349/119 |
| 2005/0179842 A1* | 8/2005 | Ichihashi ................ 349/117 |

FOREIGN PATENT DOCUMENTS

| JP | 2002-022944 A | 1/2002 |
| WO | WO 2009139131 A1 * | 11/2009 |

* cited by examiner

*Primary Examiner* — Frank Font
(74) *Attorney, Agent, or Firm* — Jean C. Edwards, Esq.; Edwards Neils PLLC

(57) ABSTRACT

Provided is a film of which the slow axis in plane does not comply with TD direction nor MD direction of the film and which is excellent in adequacy of pasting with other components. The film is a film comprising at least a first molecule expressing positive intrinsic birefringence and a second molecule expressing negative intrinsic birefringence, having a slow axis in plane in a direction which is neither parallel nor orthogonal to the longitudinal direction of the film, and the direction of the slow axis in plane being neither parallel nor orthogonal to the individual directions of alignment of the first and second molecules.

20 Claims, 3 Drawing Sheets

FILM, POLARIZING PLATE AND DISPLAY DEVICE, AND METHOD OF MANUFACTURING FILM

CROSS-REFERENCE TO RELATED APPLICATIONS

The present application claims the benefit of priority from Japanese Patent Application No. 088145/2011, filed on Apr. 12, 2011, the contents of which are herein incorporated by reference in their entirety.

BACKGROUND OF THE INVENTION

1. Field of the Invention

The present invention relates to a film useful as various optical films including optical compensation film used for display devices and protective film for polarizing film, a polarizing plate and a display device using the film, and a method of manufacturing the film.

2. Description of the Related Art

In continuous manufacturing of a long film, molecules composing the film generally align in the machine direction (MD) of the film, so that the slow axis in plane generally appears in the direction of molecular alignment or in the direction orthogonal thereto. While the molecules may otherwise be aligned in the direction (TD) orthogonal to the machine direction by stretching, or by appropriately selecting the material, it is general that also the slow axis in plane of the thus-manufactured film appears in the direction of molecular alignment or in the direction orthogonal thereto. On the other hand, there is also a strong need for films having the slow axis in plane in a direction which is neither parallel nor orthogonal to the longitudinal direction. For example, one known example of circular polarizing plate is a stack of a phase difference film having a retardation in plane of $\lambda/4$ and a polarizing film, wherein the slow axis in plane of the phase difference film and the absorption axis of the polarizing film cross at 45°. If a long film having the slow axis in plane in direction which is 45° away from the longitudinal direction is successfully provided, the film may be stacked with a long polarizing film having the absorption axis in a direction which is parallel to the longitudinal direction in a roll-to-roll manner, which largely contributes to improve the productivity.

For the purpose of manufacturing a film having the slow axis in a direction which is neither the MD nor TD, a method having been widely adopted is such as obliquely stretching the film so as to align the major constituent polymer in the direction of stretching, to thereby induce the slow axis in plane in the direction parallel to or orthogonal to the direction of alignment. For example, the above-described phase difference film typically having the slow axis in plane laid 45° away from the longitudinal direction may be manufactured by stretching in a 45° direction (see Japanese Laid-Open Patent Publication No. 2002-22944, for example). The film uniaxially stretched in the MD or TD so as to induce the slow axis in plane inparallel or orthogonal to the direction of alignment of the polymer molecule, however, tends to produce wrinkle when it is pasted to other component such as polarizing film, and may degrade the productivity.

SUMMARY OF THE INVENTION

It is therefore a subject of the present invention to provide a film having a high adequacy of pasting with other component, having the slow axis in plane which does not comply with neither the MD nor TD, a polarizing plate and a display device having the film, and a simple method of manufacturing the film.

<1> Along film comprising at least a first molecule expressing positive intrinsic birefringence and a second molecule expressing negative intrinsic birefringence, having a slow axis in plane in a direction which is neither parallel nor orthogonal to the longitudinal direction of the long film, and which is neither parallel nor orthogonal to the individual directions of alignment of the first and second molecules.

<2> The long film according to <1>,
which has a maximum speed of sound in a parallel or orthogonal direction to the longitudinal direction of the long film.

<3> A film comprising at least a first molecule expressing positive intrinsic birefringence and a second molecule expressing negative intrinsic birefringence, and having a slow axis in plane in a direction which is neither parallel nor orthogonal to the direction of maximum speed of sound.

<4> The long film according to <1> or <2>,
wherein the first and second molecules are those of the same compound and exhibit positive-negative inverted intrinsic refractive indices based on difference in the degree of crystallization.

<5> The long film according to <4>,
wherein the first molecule is a molecule of cellulose acylate-based compound in an amorphous state, and the second molecule is a molecule of cellulose acylate-based compound in a crystalline state.

<6> The long film according to any one of <1>, <2>, <4> and <5>,
wherein the first and second molecules each are molecules of additives, and the long film further comprises, as a major constituent, a polymer expressing positive or negative intrinsic birefringence.

<7> The long film according to any one of <1>, <2>, and <4> to <6>, having a retardation in plane Re(550) at 550 nm of $\lambda/4$.

<8> The long film according to any one of <1>, <2> and <4> to <7>, having a slow axis in plane in a direction which is 45° away from the longitudinal direction or from the direction of maximum speed of sound.

<9> The film according to <3>,
wherein the first and second molecules are those of the same compound and exhibit positive-negative inverted intrinsic refractive indices based on difference in the degree of crystallization.

<10> The film according to <3> or <9>,
wherein the first molecule is a molecule of cellulose acylate-based compound in an amorphous state, and the second molecule is a molecule of cellulose acylate-based compound in a crystalline state.

<11> The film according to <10>,
wherein the first and second molecules each are molecules of additives, and the film further comprises, as a major constituent, a polymer expressing positive or negative intrinsic birefringence.

<12> The film according to any one of <3> and <9> to <11>, having a retardation in plane Re(550) at 550 nm of $\lambda/4$.

<13> The film according to any one of <3> and <9> to <12>, having a slow axis in plane in a direction which is 45° away from the direction of maximum speed of sound.

<14> A polarizing plate comprising a polarizing film and a film selected from the long film according to any one of <1>, <2> and <4> to <8>, or the film according to any one of <3> and <9> to <13>.

<15> The polarizing plate according to <14>,
wherein the absorption axis of the polarizing film and the slow axis in plane of the long film or the film cross at 45°.

<16> A display device having a film selected from the long film according to any one of <1>, <2> and <4> to <8>, or the film according to any one of <3> and <9> to <13>.

<17> The display device having the polarizing plate according to <14> or <15>.

<18> A method of manufacturing the long film according to any one of <1>, <2> and <4> to <8>, or the film according to any one of <3> and <9> to <13>, comprising:

obtaining a film comprising a first molecule expressing positive intrinsic birefringence and a second molecule expressing negative intrinsic birefringence, both of the first and second molecules being aligned in a first direction; and aligning, while keeping one of the first and second molecules aligned in the first direction, the other molecule in a second direction.

<19> The method according to <18>, further comprising, after obtaining the long film or the film and before aligning the other molecule, adjusting at least one condition affective to alignability of the first molecule and the second molecule.

<20> A method of manufacturing the long film according to any one of <1>, <2> and <4> to <8> or the film according to any one of <3> and <9> to <13>, comprising:

obtaining a film comprising a molecule in an amorphous state, the molecule in an amorphous state being aligned in a first direction;

allowing a part of the molecule in an amorphous state aligned in the first direction to crystallize, so as to change it into a molecule in a crystalline state having an intrinsic birefringence with a sign opposite to a sign of the intrinsic birefringence of the molecule in an amorphous state; and allowing the molecule in a crystalline state to align in a second direction, while keeping the direction of alignment of the molecule in an amorphous state in the first direction.

Effect of the Invention

According to the present invention, a film including a long film having a high adequacy of pasting with other component, and having the slow axis in plane which does not comply with neither in the MD nor TD, a polarizing plate, a liquid crystal display device having the film, and a simple method of manufacturing the film, may be provided.

BEST MODE FOR CARRYING OUT THE INVENTION

Figure 1:
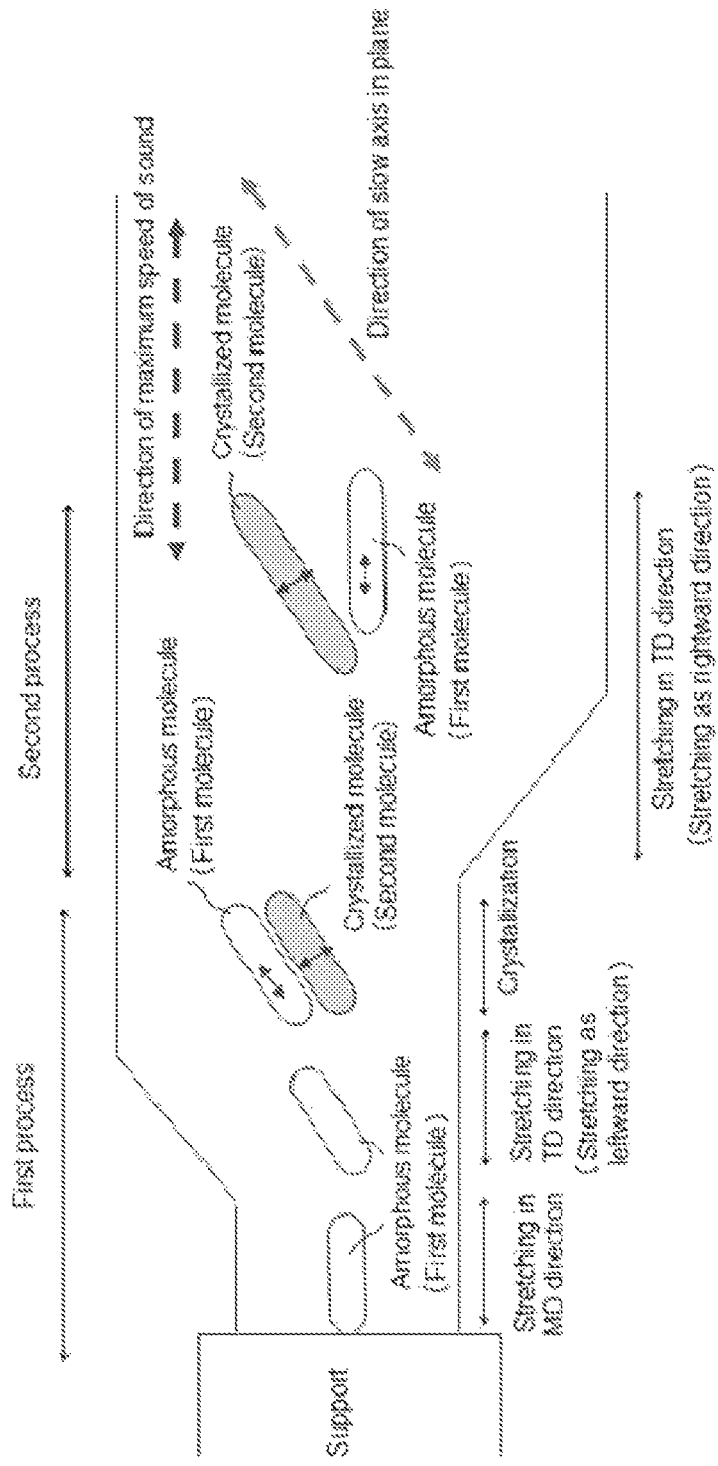
FIG. 1 is a top view schematically illustrating an exemplary scheme of a method of manufacturing a film according to the present invention.

The present invention is hereunder described in detail by reference to embodiments. Incidentally, in this specification, a numerical range expressed by the terms "a number to another number" means a range falling between the former number indicating a lower limit value of the range and the latter number indicating an upper limit value thereof.

In this specification, "MD" means the direction of feeding of film in continuous production, and "TD" means the direction orthogonal thereto. Note also that the "film" simply stated like this in this specification means both of a long film output from the continuous production (i.e., a continuous web of film), and a film having a geometry adapted to practical use, such as rectangular geometry obtained by slitting.

1. Film

The present invention relates to a long film which includes at least a first molecule expressing positive intrinsic birefringence and a second molecule expressing negative intrinsic birefringence, and has the slow axis in plane in a direction which is neither parallel nor orthogonal to the longitudinal direction of the film and is neither parallel nor orthogonal to the individual directions of alignment of the first and second molecules.

One essential feature of the long film of the present invention is that the slow axis in plane is laid neither in parallel nor orthogonal to the longitudinal direction. A known conventional method of manufacturing a film, having the slow axis in plane neither in the MD nor TD, is such as stretching the film in the direction of slow axis in plane, so as to align the molecules in the same direction. However, since the phase difference film obtainable by the method has the slow axis in plane laid in parallel or orthogonal to the direction of alignment of molecule of the major constituent polymer, so that the film may therefore produce wrinkle when it is pasted with other component such as polarizing film, and may thereby degrade the productivity. In contrast, the film of the present invention no longer needs to align the molecule of the major constituent polymer and so forth in the direction of the slow axis in plane. According to the present invention, by aligning the first molecule expressing positive intrinsic birefringence and the second molecule expressing negative intrinsic birefringence respectively in different directions, a film having the slow axis in plane in a direction different from both of the directions, for example, in a synthetic direction of the both, may be provided. Since the relation of the direction of alignment of major constituent polymer and the direction of the slow axis in plane is neither parallel nor orthogonal, so that the film of the present invention may suppress wrinkle when it is pasted to other component.

The film of the present invention preferably has the direction of maximum speed of sound laid in parallel or orthogonal to the longitudinal direction, in view of more effectively suppressing wrinkle in the process of pasting with other components. In general, the film has the largest hardness in the direction of maximum speed of sound, which corresponds to the direction in parallel or orthogonal to the direction of alignment of the major constituent polymer.

The direction of maximum speed of sound of the film, preliminarily controlled in the moisture content in an atmosphere of 25° C. and 60% RH for 2 hours or longer, was determined using a ultra sonic fiber/molecular orientation tester "SST-2501" from Nomura Shoji Co., Ltd. in an atmosphere of 25° C. and 60% RH, by measuring the speed of sound in each direction defined by dividing 360° by 32, and by finding the maximum.

The present invention also relates to a film cut into rectangular form, which is a geometry in the practical use of the long film of the present invention. An essential feature of one embodiment of the film is that the film contains at least a first molecule expressing positive intrinsic birefringence and a second molecule expressing negative intrinsic birefringence, and has the slow axis in plane in the direction which is neither parallel nor orthogonal to the direction of maximum speed of sound.

The film of the present invention contains at least a first molecule expressing positive intrinsic birefringence and a second molecule expressing negative intrinsic birefringence. In the present invention, the first and second molecules may be those of the same compound. Some polymer compounds show inverted signs of intrinsic refractive index between the amorphous state and crystalline state. The present invention wisely adopts this sort of polymer compound as a source material of the film.

Some cellulose acylate-based compounds show positive intrinsic birefringence in the amorphous state, and shows negative intrinsic birefringence in the crystalline state. One embodiment of the film of the present invention exemplified herein contains a cellulose acylate-based compound as a source material, wherein the first molecule is a molecule of the cellulose acylate-based compound in the amorphous state, and a second molecule is a molecule of the cellulose acylate-based compound in the crystalline state. In this embodiment, the film may contain the cellulose acylate-based compound as the major source, or may contain other polymer as the major source. In the former case, the film may further contain an additive which exhibits positive or negative intrinsic birefringence. On the other hand, in the latter case, other polymer used as the major constituent may be a polymer expressing positive intrinsic birefringence, or may be a polymer expressing negative intrinsic birefringence.

Presence of the molecule in the crystalline state may be confirmed by measuring heat of fusion of the film. A method of measurement will be described later in Example.

In the embodiment wherein the first and second molecules are molecules of the same compound, the process of manufacturing of the film necessarily includes crystallization of a part of the compound. For example, molecules of the polymer compound are aligned, typically by stretching, into a predetermined direction while keeping the amorphous state. Thereafter, a part of the molecules is crystallized, and then alignment in the other direction is induced typically by stretching. By conducting the second stretching according to a condition under which difference in the alignability between the molecule in the crystalline state and molecule in the amorphous state is ensured, only the direction of alignment of the molecule in the amorphous state may be changed while keeping the direction of alignment of the molecule in the crystalline state unchanged. The slow axis in plane appears in a synthetic direction of the direction of alignment of the molecule in the crystalline state and the direction of alignment of the molecule in the amorphous state. In view of ensuring certain levels of flexibility and strength of the film, ratio of the molecule in the crystalline state is preferably 5 to 10% or around, which is equivalent to 2.0 to 0.0 J/g when converted into the heat of fusing. The heat of fusing is preferably 2.0 J/g or smaller, and preferably exceeds 0.0 J/g, although not limited in this range. For example, molecule in the amorphous state preferably forms a matrix of the film, and the molecule in the crystalline state preferably dispersed in the matrix. In this embodiment, molecule in the amorphous state composing the matrix of the film is preferably aligned in parallel or orthogonal to the longitudinal direction, in view of further improving the handleability of the film, and the adequacy of pasting with other components such as polarizing film.

In the present invention, the first and second molecules may alternatively be molecules of different compounds. One embodiment of the present invention relates to a film, which contains the first and second molecules respectively as molecules of additives, and further contains a major constituent polymer having positive or negative intrinsic birefringence. In this embodiment, the molecules of the first and second additives, aligned in different directions, are preferably dispersed in a matrix configured by the major constituent polymer. The major constituent polymer preferably aligns in the same direction with the molecules of the either one of the first and second additives. In one embodiment, the major constituent polymer has positive intrinsic birefringence, and aligns in the direction different from the direction of alignment of molecule of the second additive, and in the same direction with molecule of the first additive. In this embodiment, the slow axis in plane appears in a synthetic direction of the direction of alignment of molecule of the second additive, and the direction of alignment of molecule of the first additive (the direction of alignment of the major constituent polymer).

In the embodiment where the first and second molecules are ascribable to different compounds, it is necessary to subject the film to alignment process (stretching, for example) under a condition not causative of difference in the alignability of the first and second molecules during the manufacturing process of the film, and then to subject the film to alignment process (stretching, for example) under a condition causative of difference in the alignability between the first and second molecules. For example, typically by stretching, molecules of the first and second additives, and molecule of the polymer compound are aligned in a predetermined direction. Then, again typically by stretching, alignment in the other direction is induced. If the film is stretched, for example, under a condition causative of difference in the alignability between molecule of the first additive or the major constituent polymer, and molecule of the second additive, it is now possible to change the direction of alignment of molecule of the first additive and the major constituent polymer, while keeping the alignment state of molecule of the second additive unchanged. The slow axis in plane appears in a synthetic direction of the direction of alignment of molecule of the second additive, and the direction of alignment of molecule of the first additive or the major constituent polymer. In this embodiment, it is preferred that the major constituent polymer composing the matrix aligns in a direction parallel or orthogonal to the longitudinal direction, because the film may further be improved in the handleability, and in the adequacy of pasting with other components such as polarizing film.

While the description in the above dealt with a case where a polymer expressing positive intrinsic birefringence was used as the major constituent polymer, a polymer expressing negative intrinsic birefringence may, of course, be used as the major constituent polymer. In this embodiment, the major constituent polymer is preferably aligned together with molecule of the second additive expressing negative intrinsic birefringence. In this embodiment, the slow axis in plane appears in a synthetic direction of the direction of alignment of molecule of the first additive, and the direction of alignment of molecule of the second additive or the major constituent polymer.

Materials and methods adoptable to manufacturing of the film of the present invention will be detailed below.

1.-(1) Material

The film of the present invention contains at least a first molecule expressing positive intrinsic birefringence and a second molecule expressing negative intrinsic birefringence. Note that "expressing positive intrinsic birefringence" in the context of the specification means that larger refractive index appears in the direction of alignment of the longitudinal axis of molecule than in the direction orthogonal thereto, and "expressing negative intrinsic birefringence" means that smaller refractive index appears in the direction of alignment of the longitudinal axis of molecule than in the direction orthogonal thereto. Values of intrinsic birefringence may also be calculated from a distribution of dielectric constant.

Each of the first and second molecules may be a low-molecular-weight compound or may be a polymer compound, and may be a major constituent or an additive. Examples of the additive include plasticizer, UV absorber, and optical characteristic modifier. Materials adoptable thereto will be exemplified below, but not limited thereto.

(a) Compounds Expressing Positive Intrinsic Birefringence
(a1) Plasticizer Expressing Positive Intrinsic Birefringence Plasticizer expressing positive intrinsic birefringence is adoptable to the present invention. Examples of the plasticizer include polymer-based plasticizer. The polymer-based additive preferably has a number-average molecular weight of 200 to 10000, more preferably 200 to 5000, and particularly preferably 200 to 2000.

The polymer-based plasticizer may be selected from those composed of poly-ester based polymer, polyether-based polymer, polyurethane-based polymer, and copolymers of constituent monomers of these polymers. Among them, aliphatic polyester, aromatic polyester, and polyester-based copolymer containing aliphatic residue and aromatic residue are preferable.

Polyester-Based Polymer

The polyester-based polymer adoptable to the present invention may be obtained by reaction between a dicarboxylic acid component and a diol component, and preferably obtained by reaction of a mixture of a $C_{2-20}$ aliphatic dicarboxylic acid and a $C_{8-20}$ aromatic dicarboxilic acid, with at least one or more species of diols selected from $C_{2-12}$ aliphatic diol, $C_{4-20}$ alkyletherdiol, and $C_{6-20}$ aromatic diol. While both terminals of the reaction product may be remained unmodified, they may further be reacted with any of monocarboxylic acids, monoalcohols and phenols so as to achieve so-called termination of the terminals. The termination is particularly effective from the viewpoint of storability, when it is aimed at excluding all free carboxylic acids from the polymer. The dicarboxylic acid used for synthesizing the polyester-based polymer in the present invention is preferably $C_{4-20}$ aliphatic dicarboxylic acid residue or $C_{8-20}$ aromatic dicarboxylic acid residue.

The diol used for synthesizing the polyester-based polymer as the polymer-based plasticizer is typically selected from $C_{2-20}$ aliphatic dials, $C_{4-20}$ alkyl ether diols, and $C_{6-20}$ aromatic ring-containing diols.

In the present invention, the polymer-based plasticizer having the terminals thereof terminated by alkyl groups or aromatic groups are preferable. This is because protection of the terminals with hydrophobic functional groups is effective in view of suppressing time-dependent degradation of the plasticizer under high temperature and high humidity, and delays hydrolysis of the ester group.

Both terminals of the polyester-based polymer are preferably protected by monoalcoholic residues or monocarboxylic acid residues, so that both terminals will have neither carboxyl group nor OH group.

In blocking with a monocarboxylic acid residue, the monocarboxylic acid for use as the monocarboxylic acid residue is preferably a substituted or unsubstituted monocarboxylic acid having from 1 to 30 carbon atoms. Concretely, for example, the above-mentioned dibasic acid or its alkyl ester is reacted with a glycol through polyesterification or interesterification according to a thermal fusion condensation method; or the acid chloride is reacted with a glycol according to an interfacial condensation method. The polyester plasticizers are described in detail in Koichi Murai, Plasticizers, Their Theory and Application, (by Miyuki Publishing, Mar.

1, 1973, 1st Edition). In addition, the materials described in JP-A 05-155809, 05-155810, 05-197073, 2006-259494, 07-330670, 2006-342227, 2007-003679 are also usable herein.

Commercial products are also usable. For example, Adeka's polyester plasticizers described in Diary 2007, pp. 5-27 (various types of Adekacizer P series, Adekacizer PN series are shown) are usable; Dai-Nippon Ink Chemical Industry's various commercial products of Polylight series described in List of Polymer-Related Commercial Products, 2007, p. 25 are usable; and Dai-Nippon Ink Chemical Industry's various commercial products of Polycizer series described in DIC's Polymer Modifiers (issued Jan. 4, 2004, 000VIII), pp. 2-5 are usable. Further, US CP HALL's Plasthall P series are available. Velsicol Chemicals (Rosemont, Ill.) commercially sell benzoyl-functionalized polyethers as trade name of Benzoflex (e.g., Benzoflex 400, polypropylene glycol dibenzoate).

(a2) UV Absorber Expressing Positive Intrinsic Birefringence

Examples of the UV absorber expressing positive intrinsic birefringence include those described in Japanese Laid-Open Patent Publication No. 2009-262551.

Specific examples of the positive intrinsic birefringence will be shown below, but not limited thereto.

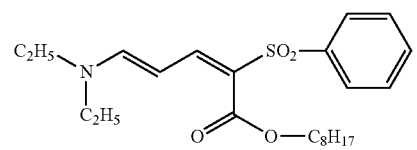

Compound AB

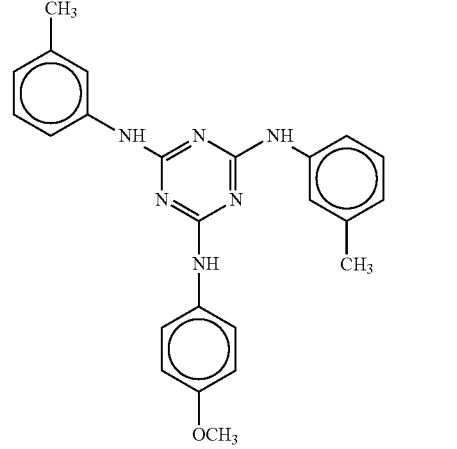

Compound AC (a3) Polymer Expressing Positive Intrinsic Birefringence

Examples of other polymers expressing positive intrinsic birefringence include polycarbonate, polyarylate, poly(ethylene terephthalate), poly(ether sulfone), poly(phenylene sulfide), poly(phenylene oxide), poly(aryl sulfone), polyamide-imide, polyimide, polyolefin, and polyacrylonitrile. The examples still further include not only homopolymer, but also copolymer, derivatives of these polymers, and blended polymers. Also amorphous cellulose acylate having an acyl substitution degree of 2.6 to 3.0 is adoptable, by virtue of its positive intrinsic birefringence. It is, however, to be noted that cellulose acylate necessarily resides in the amorphous state, since crystallized cellulose acylate expresses negative intrinsic birefringence as described later.

Some polymer compounds functioning as an optical anisotropy controlling agent express positive intrinsic birefringence, and may preferably be used. The optical anisotropy controlling agent are described in Japanese Laid-Open Patent Publication No. 2005-104148.

(b) Compound Expressing Negative Intrinsic Birefringence

Examples of the polymer expressing negative intrinsic birefringence include polystyrene-based polymer, acrylate ester-based polymer, methacrylate ester-based polymer, acrylonitrile-based polymer, and methacrylonitrile-based polymer.

Monomers (B) capable of giving polymer which expresses negative intrinsic birefringence polymer include methyl methacrylate (MMA), styrene, isopropyl methacrylate (iPMA), ethyl methacrylate (EMA), butyl methacrylate (BMA), tert-butyl methacrylate (t-BMA), and methyl-α-fluoroacrylate (MFA). Also cellulose acylate having large total acyl substitution degree and crystalline cellulose acylate express negative intrinsic birefringence, and may be adoptable to the present invention.

Specific examples of the polystyrene-based polymer include homopolymers of styrene and styrene derivative; copolymers of styrene and styrene derivative; and blends of these materials.

Examples of the styrene derivative include α-methylstyrene, o-methylstyrene, p-methylstyrene, p-chlorostyrene, p-phenylstyrene, and 2,5-dichlorostyrene. Examples of copolymer of styrene and styrene derivative (abbreviated as "ST", hereinafter) include ST/crylonitrile, ST/methacrylonitrile, ST/methyl methacrylate, ST/ethyl methacrylate, ST/α-chloroacryloniltrile, ST/methyl acrylate, ST/ethyl acrylate, ST/butyl acrylate, ST/acrylic acid, ST/methacrylic acid, ST/butadiene, ST/isoprene, ST/maleic anhydride, ST/vinyl acetate, copolymer and styrene/styrene derivative copolymer. The examples also include ternary copolymers, besides the above-described binary copolymers. Examples of the blends include not only those composed of two or more species selected from styrene homopolymer, styrene derivative homopolymer, and styrene and styrene derivative copolymer, but also include blends obtained by blending a polymer of styrene and styrene derivative (abbreviated as "PST", hereinafter), with a non-PST-containing polymer. Examples of the latter blend include PST/butyl cellulose and PST/coumarone resin.

Also styrene and its derivative may be adoptable as the compound expressing negative intrinsic birefringence. Examples of styrene derivative include p-hydroxystyrene, methoxystyrene, ethoxyethoxystyrene, and acetoxystyrene. Examples of the compounds expressing negative intrinsic birefringence also include maleic anhydride and its polymer.

(c) Preferable Combinations

Examples of preferable combinations of materials for composing the film of the present invention will be listed below, but not limited thereto.

TABLE 1

| Example | Molecule expressing positive intrinsic birefringence | Molecule expressing negative intrinsic birefringence | Major constituent polymer |
| --- | --- | --- | --- |
| 1 | Amorphous cellulose acylate | Crystalline cellulose acylate | Cellulose acylate |
| 2 | Polymer-based plasticizer | p-Hydroxystyrene | Polyolefin |

1.-(2) Methods of Manufacturing

The film of the present invention may be manufactured by various methods. The film may be manufactured by film forming processes such as liquid film forming process or melting forming process, followed by alignment process such as stretching. In the present invention, it is necessary to align the first and second molecules in different directions, and to align the first and second molecules so as to induce difference in the alignability between the first and second molecules. The liquid film forming process is advantageous in view of simplicity of manufacturing of the film of the present invention, since the amount of solvent contained in the film during stretching is adjustable depending on drying conditions, and also since the difference for example in the solvent content during stretching may induce a distinctive difference in the alignability between different molecules. Exemplary methods of manufacturing of the film according to the present invention will be explained below, without limiting the present invention.

One exemplary method of manufacturing of the film according to the present invention comprises:

a first process obtaining a film which contains a first molecule expressing positive intrinsic birefringence and a second molecule expressing negative intrinsic birefringence, both of the first and second molecules being aligned in a first direction; and a second step aligning, while keeping one of the first and second molecules aligned in the first direction, the other molecule in a second direction.

For the special case where the first and second molecules are those of the same compound, and the one is a molecule in the amorphous state and the other is a molecule in the crystalline state, an exemplary method of manufacturing includes:

a first process obtaining a film which contains a molecule in the amorphous state, molecule in the amorphous state being aligned in a first direction;

a process allowing a part of molecule in the amorphous state aligned in the first direction to crystallize, so as to change it into a molecule in the crystalline state having an intrinsic birefringence with a sign opposite to that of the intrinsic birefringence of molecule in the amorphous state; and a second process allowing the molecule in the crystalline state to align in a second direction, while keeping the direction of alignment of the molecule in the amorphous state in the first direction.

(First Process)

In the first process, a film which contains a first molecule expressing positive intrinsic birefringence and a second molecule expressing negative intrinsic birefringence, both of the first and second molecules being aligned in a first direction, is obtained. The film is preferably formed by casting a polymer solution (also referred to as "dope", hereinafter). Note that the term "web" denotes a film formed by casting, and still retains the solvent to a certain degree. A major solvent of the polymer solution is preferably an organic solvent which serves as a good solvent for the major constituent polymer (cellulose acylate, for example). The polymer solution may contain one or more species of additives, together with the major constituent polymer.

In the first process, a film in which both of the first and second molecules align in the first direction is obtained. The first molecule expressing positive intrinsic birefringence and the second molecule expressing negative intrinsic birefringence may be aligned in the first direction, by stretching a web having a certain range of residual solvent content. Stretching in this process is preferably proceeded under conditions not causative of difference in the alignability between the first and second molecules.

In the first process of the method of manufacturing for the case where the first and second molecules are those of the same compound (cellulose acylate compound, for example), a film containing molecule of an cellulose acylate compound in the amorphous state is obtained, and the film is stretched in a predetermined direction, so as to align the molecule of the cellulose acylate compound in the amorphous state to the first direction. Thereafter, a part of the molecule in the amorphous state aligned in the first direction is crystallized, so as to convert the part into molecule in the crystalline state having intrinsic birefringence with a sign inverted from that of the intrinsic birefringence of molecule in the amorphous state. Molecules of some cellulose acylate-based compounds express positive intrinsic birefringence in the amorphous state, but express negative intrinsic birefringence in the crystallized state. By using this sort of cellulose acylate-based compound, the film which contains the first molecule expressing positive intrinsic birefringence and the second molecule expressing negative intrinsic birefringence, and in which both of the first and second molecules being aligned in a first direction, may be manufactured.

The first direction is preferably neither the MD nor TD. However, from the technical point of view, the stretching is ready in the MD or TD. The molecules may be aligned in a direction which is neither MD nor TD, preferably by stretching the film once in the MD while keeping a large amount of residual solvent retained therein, and then by stretching it in one of the TD (assuming that the TD as the width-wise direction, either one of the leftward or rightward direction, for example). For example, the film having a residual solvent content of 300 to 30% is stretched in the MD at a film surface temperature of 70 to −30° C. at a stretching ratio of 0 to 100%, dried to reduce the residual solvent content down to 200 to 30%, and then stretched in the TD at a film surface temperature of 70 to −30° C. at a stretching ratio of 0 to 100%. The stretching ratio herein is adjustable within a desired range, by appropriately adjusting ratio of drum speed and tenter feeding speed. The stretching temperature (surface temperature of the web) is adjustable in a desired range, by controlling temperature of supporting components such as drum, using a coolant, or blowing hot air or cold air. The residual solvent content may be calculated according to the equation below:

$$\text{Residual solvent content (\% by mass)} = \{(M-N)/N\} \times 100$$

[wherein M represents mass of the film immediately before being brought into a stretching zone, and N represents mass of the film immediately before being brought into a stretching zone, and dried at 120° C. for 2 hours].

In the embodiment, molecule in the amorphous state is aligned in the first direction, and a part of which is then crystallized. The crystallization may be proceeded by drying the web so as to reduce the residual solvent content to a predetermined value, while controlling the surface temperature thereof. For example, a web containing a cellulose acylate-based compound as a major constituent may be partially crystallized, by reducing the residual solvent content, from a state with a residual solvent content of 6 to 120% by mass, down to a state with a residual solvent content of lower than 12% by mass, while controlling the surface temperature so as not to reach 200° C. or above. By the crystallization, a film in which the molecule (second molecule) of the cellulose acylate-based compound in the crystalline state and the molecule (first molecule) of the cellulose acylate compound in the amorphous state align in the first direction, may be formed.

On the other hand, in the embodiment where the first and second molecules are those of different additives, a film in which molecules of the first and second additives align in the first direction may be obtained, by casting the a polymer solution containing these additives to form a web, drying the web so as to reduce the residual solvent content, and then stretching the resultant film in a predetermined direction (width-wise direction, for example). While conditions of stretching are not specifically limited, preferable conditions include a residual solvent content of 50 to 10% by mass, a film surface temperature of 50 to 200° C., and a stretching ratio in the TD of 10 to 100%.

(Second Process)

Next, while keeping the direction of alignment of either one of the first and second molecules in the first direction, the other molecule is aligned in the second direction (second process). In the second process, the alignment in the second direction is preferably accomplished by stretching. For an exemplary case where the stretching in the above-described first process has been made in either one of the width-wise direction (TD) of the film (assuming that the TD as the width-wise direction, either one of the leftward or rightward direction, for example), the film is stretched in the other TD, so as to align either one of the first and second molecules in the second direction. In this example, conditions of stretching are adjustable so as to align the second direction closer to the MD as compared with the first direction, typically so that the second direction agrees with the MD. The slow axis in plane appears in a synthetic direction of, the first direction and the second direction. For the case where the film also contains a major constituent polymer together with the first and second molecules, it is preferable in the second process to align also the major constituent polymer in the second direction.

In view of stably proceeding the second process, it is preferable to adjust at least one condition affective to the alignability of the first molecule and the second molecule. Examples of conditions affective to the alignability of the first and second molecules include residual solvent content and film surface temperature, and also molecule-specific properties such as glass transition temperature, molecular weight, and compatibility with the matrix-forming molecule of the individual molecules.

For example, molecule in the crystalline state and molecule in the amorphous state of the same compound have the same molecular weight, but different levels of intensity of intermolecular interaction and size of molecular cluster, so that molecule in the amorphous state may stably be aligned in the second direction while keeping the molecule in the crystalline state aligned in the first direction, by conducting the second process only after the conditions including ratio of volatile component (solvent) contained in the film and film surface temperature were appropriately adjusted. On the other hand, molecules of different additives have different characteristics including molecular weight, glass transition temperature, and compatibility with the matrix-forming molecule, so that in some cases either one of the molecules may stably be aligned in the second direction, while keeping the other molecule aligned in the first direction, based on the difference in the characteristics, by appropriately adjusting the conditions similarly as described in the above.

Figure 2:
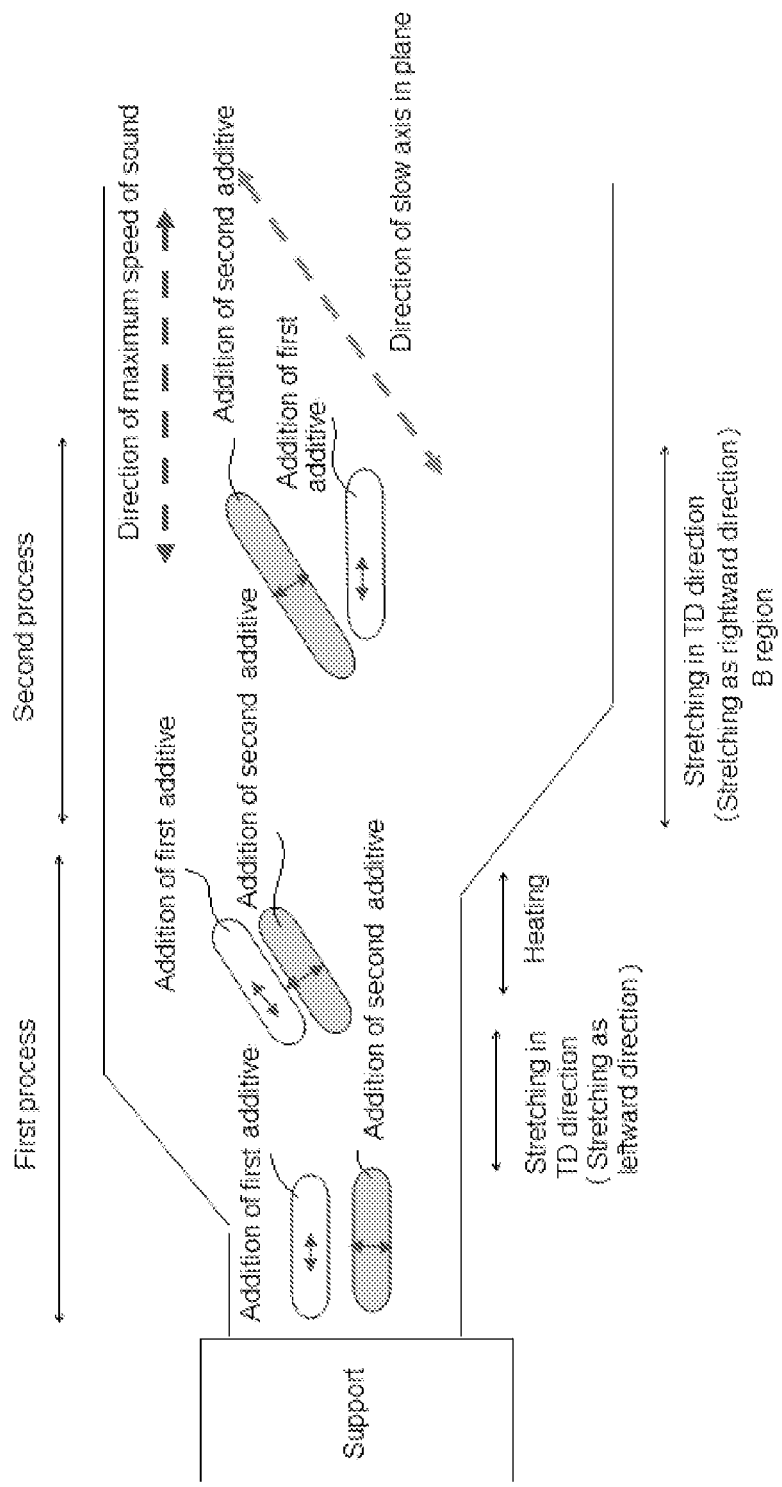
FIG. 2 is a top view schematically illustrating another exemplary scheme of a method of manufacturing a film according to the present invention.

A top view schematically illustrating an exemplary scheme of manufacturing of a film in an embodiment in which the first and second molecules are those of a cellulose acylate compound is shown in FIG. 1, and a top view schematically illustrating another exemplary scheme of manufacturing of a film in another embodiment in which the first and second molecules are respectively those of additives is shown in FIG. 2.

1.-(3) Characteristics

Characteristics of the film of the present invention are not specifically limited. A film having a desired level of retardation Re and the slow axis in plane aligned in a desired direction may be manufactured, by appropriately adjusting conditions and direction of stretching, and by selecting various components used as the source materials. One example of the film of the present invention is a λ/4 plate which expresses a retardation of λ/4 at 550 nm. The λ/4 plate is useful as a component of a circular polarizing plate for example. In particular, the λ/4 plate having the slow axis in plane in the direction inclined 45° away from the longitudinal direction is highly useful, since the plate may be stacked with a polarizing film having the absorption axis laid in parallel to the longitudinal direction in a roll-to-roll manner so as to produce a circular polarizing plate. In short, one preferable embodiment of the film of the present invention relates to a λ/4 plate having the slow axis in plane inclined 45° away from the longitudinal direction.

Incidentally, in this specification, Re (λ) and Rth (λ) represent an in-plane retardation and a retardation in the thickness direction at a wavelength of λ, respectively. The Re (λ) is measured by making light having a wavelength of λ nm incident in a normal direction of the film in KOBRA 21ADH or WR (manufactured by Oji Scientific Instruments). In selecting the measuring wavelength λ nm, the measurement can be achieved by manually exchanging a wavelength selective filter or converting a measured value with a program, etc. In the case where the film to be measured is expressed by a uniaxial or biaxial refractive index ellipsoid, the Rth (λ) is calculated in the following manner.

The Rth (λ) is calculated by KOBRA 21ADH or WR on the basis of six measured Re (λ) values, an assumed value of the average refractive index, and an inputted film thickness. The retardation Re (λ) values are measured such that light having a wavelength of λ nm is made incident to the film from six directions tilted to 50° on one side at intervals of 10° to the film normal line, using an in-plane slow axis (detected by KOBRA 21ADH or WR) as a tilt axis (rotation axis) (when the film has no slow axis, an arbitrary in-plane direction is used as the rotation axis). In the foregoing, when a retardation value measured using the in-plane slow axis as the rotation axis is zero at a certain tilt angle to a normal line direction, the sign of a retardation value at a tilt angle larger than the foregoing certain tilt angle is converted to a negative sign, and the negative retardation value is then used in the calculation by KOBRA 21ADH or WR. Incidentally, the Rth can also be calculated by the following expressions (A) and (B) on the basis of an assumed value of the average refractive index, an inputted thickness value, and two retardation values measured in arbitrary two tilt directions, using the slow axis as the tilt axis (the rotation axis) (when the film has no slow axis, an arbitrary in-plane direction is used as the rotation axis).

refractive index in a slow axis direction in the plane; ny represents a refractive index in a direction orthogonal to nx in the plane; and nz represents a refractive index in a direction orthogonal to nx and ny.

$$Rth=\{(nx+ny)/2-nz\} \times d \quad (B)$$

In the case where the film to be measured cannot be expressed in terms of a uniaxial or biaxial refractive index ellipsoid, and thus has no so-called optic axis, the Rth (λ) is calculated in the following manner. The Rth (λ) is calculated by KOBRA 21ADH or WR on the basis of eleven measured Re (λ) values, an assumed value of the average refractive index, and an inputted film thickness value. The retardation Re (λ) values are measured such that light having a wavelength of λ nm is made incident to the film from eleven directions tilted at −50° to +50° at intervals of 10° to the film normal line direction, using an in-plane slow axis (detected by KOBRA 21ADH or WR) as a tilt axis (rotation axis). Also, in the foregoing measurements, as the assumed values of the average refractive indices, those described in *Polymer Handbook* (JOHN WILEY & SONS, INC.) and catalogs of various optical films can be used. Unknown average refractive indices may be obtained by measurement using an Abbe refractometer. The average refractive indices of major optical film materials are as follows: cellulose acylate (1.48), cycloolefin polymer (1.52), polycarbonate (1.59), polymethyl methacrylate (1.49), and polystyrene (1.59). The above values of nx, ny, and nz are calculated by KOBRA 21ADH or WR from the inputted assumed average refractive index and film thickness value. Nz is further calculated from thus obtained nx, ny, and nz according to an expression: Nz=(nx−nz)/(nx−ny).

In this specification, the terms "parallel" and "orthogonal" mean that the designated angle falls within the range of less than ±10° from a strict angle. This range is preferably less than ±5°, and more preferably less than ±2° in terms of an error from the strict angle. Also, the "slow axis" means a direction at which the refractive index is maximum.

Incidentally, a measuring wavelength of the refractive index is a value at λ=550 nm of a visible light region unless otherwise indicated; and measuring wavelengths of Re and Rth are defined to be 550 nm unless otherwise indicated.

2. Polarizing Plate and Display Device

The present invention also relates to a polarizing plate configured by a polarizing film and the film of the present invention; and a display device having the film of the present invention. Note that the terms of "polarizing film" and "polarizing plate" are discriminatively used in this specification, wherein the "polarizing plate" means a stack having, formed on at least one surface of the "polarizing film", a transparent protective film for protecting it. Also note that the term "polarizing plate" in the context of this specification is used to embrace all of "linear polarizing plate", "circular polarizing plate" and "elliptically polarizing plate".

One example of the polarizing plate of the present invention is such as having the film of the present invention, configured as a λ/4 plate, having the slow axis in plane inclined $$Re(\theta) = \left[ nx - \frac{ny \times nz}{\sqrt{\left(ny \sin\left(\sin^{-1}\left(\frac{\sin(-\theta)}{nx}\right)\right)\right)^2 + \left(nz \cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \quad (A)$$

In the foregoing expression (A), Re (θ) represents a retardation value in a direction tilted at an angle θ to a film normal line direction. Also, in the expression (A), nx represents a 45° away from the longitudinal direction, and a polarizing film, in which the absorption axis of the polarizing film and the slow axis in plane of the film cross at 45°. The polarizing plate is adoptable to various display devices including liquid crystal display device, self-emissive display device and so forth, as a circular polarizing plate or an elliptically polarizing plate. The polarizing plate is also used as a circular polarizing plate adoptable to 3D image display device, a component for configuring circular polarized glasses used for viewing 3D image, and antireflection film.

Examples of the polarizing film include an iodine-based polarizing film, a dye-based polarizing film using a dichroic dye, and a polyene-based polarizing film, and all of these may be used in the invention. In general, the iodine-based polarizing film and the dye-based polarizing film are manufactured using a polyvinyl alcohol-based film.

(Protective Film)

As the protective film to be stuck onto the other surface of the polarizing film, it is preferable to use a transparent polymer film. The term "transparent" means that the film has a light transmittance of 80% or more. As the protective film, a cellulose acylate film and a polyolefin film containing a polyolefin are preferable. Of cellulose acylate films, a cellulose triacetate film is preferable. Also, of polyolefin films, a cyclic polyolefin-containing polynorbornene film is preferable.

A thickness of the protective film is preferably from 20 to 500 and more preferably from 50 to 200 μm.

(Light Diffusion Film)

The polarizing plate may have a light diffusion film on the surface of one side of the polarizing film. The light diffusion film may be a single-layer film or may be a laminate film. Examples of an embodiment of a laminate film include a light diffusion film having a light scattering layer. The light diffusion film contributes to an improvement of the viewing angle when the viewing angle is inclined in the up/down right/left direction. In an embodiment in which an antireflection layer is disposed outside the polarizing film on the display surface side, especially high effects are brought. The light diffusion film (or its light scattering layer) can be formed from a composition having a fine particle dispersed in a binder. The fine particle may be an inorganic fine particle or may be an organic fine particle. As to the binder and the fine particle, it is preferable that a difference in refractive index is from about 0.02 to 0.20. Also, the light diffusion film (or its light scattering layer) may also be provided with a hard coat function. Examples of the light diffusion film which can be utilized in the invention include those in which a light scattering coefficient is specified, as described in JP-A-11-38208; those in which a relative refractive-index between a transparent resin and a fine particle is allowed to fall within a specified range, as described in JP-A-2000-199809; and those in which a haze value is specified to be 40% or more, as described in JP-A-2002-107512.

(Hard Coat Film, Antiglare Film, and Antireflection Film)

The cellulose acylate film may be applied to a hard coat film, an antiglare film, or an antireflection film, as the case may be. For the purpose of enhancing the visibility of a flat panel display such as LCD, PDP, CRT, and EL, any one or all of a hard coat layer, an antiglare layer, and an antireflection layer can be given on one or both surfaces of the cellulose acylate film. Desirable embodiments as such an antiglare film or antireflection film are described in detail in *Journal of Technical Disclosure*, No. 2001-1745, pages 54 to 57, issued on Mar. 15, 2001 by Japan Institute of Invention and Innovation, and those can be preferably adopted in the cellulose acylate film.

The film of the present invention may be used as various components of liquid crystal display device based on various modes, and as optical compensation film or the like. Examples of drive modes of liquid crystal cell include twisted nematic (TN) mode, super twisted nematic (STN) mode, verticalignment (VA) mode, in-plane switching (IPS) mode, optically compensated bend (OCB) mode, without special limitation.

The film of the present invention may also be stacked with an optically-anisotropic layer, having a liquid crystal composition aligned thereon in a fixed manner, to form a stacked film, and may be adoptable to various applications including optical compensation film of liquid crystal display. Examples of liquid crystal used for forming the optically-anisotropic layer include rod-like liquid crystal and discotic liquid crystal. Also the state of alignment adopted when the optically-anisotropic layer is formed is selectable depending on desired optical characteristics, typically from horizontal alignment, vertical alignment and hybrid alignment.

EXAMPLES

The present invention is hereunder more specifically described by reference to Examples and Comparative Examples. Materials, use amounts, proportions, treatment contents, treatment procedures, and so on shown in the following Examples can be properly changed so far as the gist of the invention is not deviated. In consequence, it should not be construed that the scope of the invention is limited to the following specific examples.

Physical characteristics of the films manufactured in Examples were measured according to the methods described below.

(1) Measurement of Heat of Crystallization (ΔHc)

Five to six milligrams of each cellulose acylate film manufactured in Examples below was placed in an aluminum measurement pan (Cat. No. 8578, from Rigaku Corporation) of a DSC analyzer (DSC8230, from Rigaku Corporation), the sample film was then heated under a 50 mL/min nitrogen flow, from 25° C. to 120° C. at a heating rate of 20° C./min, kept at 120° C. for 15 minutes, and then cooled down to 30° C. at a cooling rate of 20° C./min. The sample film was heated again from 30° C. to 320° C. at a heating rate of 20° C./min, and a het of crystallization was calculated based on an area surrounded by an exothermic peak observed in the measurement and the base line of the sample. The larger the value, the more the crystallization of the cellulose acylate molecule in the film proceeds.

(2) Measurement of Direction of Maximum Speed of Sound

Speed of sound of the film, preliminarily controlled in the moisture content in an atmosphere of 25° C. and 60% RH for 2 hours or longer, was measured using a ultra sonic fiber/molecular orientation tester "SST-2501" from Nomura Shoji Co., Ltd. in an atmosphere of 25° C. and 60% RH, in each direction defined by dividing 360° by 32, and the maximum speed was found.

(3) Measurement of Direction of Slow Axis in Plane

Direction of slow axis of retardation was determined by measuring retardation at 550 nm using an automatic birefringence analyzer KOBRA-WR (from Oji Scientific Instruments).

Example 1

(1) Manufacturing of Cellulose Acylate Film
(1-1) Preparation of Dope and Casting Polymer solution "A" containing a plasticizer AA-1 (condensate of ethane diol/adipic acid (1/1 by molar ratio), number-average molecular weight=1000) and a positive intrinsic birefringence material BB-1 (compound BB-1 represented by the formula below), and having a composition below was heated to 30° C., and then cast through a T-die onto a mirror-polished surface of a stainless steel support. Surface temperature of the support was set to −5° C., and width of coating was set to 200 cm. Ambient temperature of an overall space of the casting zone was set to 15° C.

| Composition of Polymer Solution "A" | |
|---|---|
| Cellulose acetate with an average substitution degree of 2.94 | 100.0 parts by mass |
| Methylene chloride (first solvent) | 295.2 parts by mass |
| Methanol (second solvent) | 70.1 parts by mass |
| Butanol (third solvent) | 3.7 parts by mass |
| Silica particle with an average particle size of 16 nm (AEROSIL R972, from Nippon Aerosil Co., Ltd.) | 0.13 parts by mass |
| Plasticizer (Compound AA-1, shown above) | 10.0 parts by mass |
| Positive intrinsic birefringence material (Compound BB-1, below) | 3.5 parts by mass |
| Citrate ester | 0.01 parts by mass |

Compound BB-1

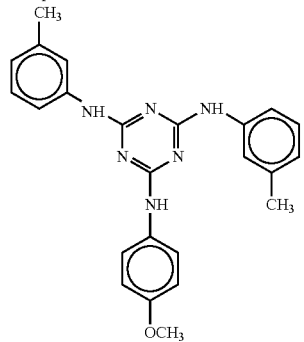

(1-2) First Stretching Process

The cast and rolled cellulose acylate film (web), with a residual solvent content of 270%, was separated from the drum at a position 50 cm away from the end point of the casting zone on the upstream side, conveyed by a pin tenter, and stretched in the MD by 40% (first stretching process).

The stretching ratio (%) of the film in the first stretching process was determined based on ratio of drum speed and tenter feeding speed. Stretching temperature (surface temperature of the web) was kept to −5° C., by controlling the drum temperature using a coolant. Stretching speed was set to 1000%/min.

(1-3) Drying Process, Second Stretching Process

Upon completion of the first stretching process, the film was further stretched in the transverse direction only on one side, as schematically illustrated in FIG. 1 (Second Stretching Process). In this process, a part of the web before being dried was sampled; and the residual solvent content and the direction of maximum speed of sound were determined, based on a change in weight before and after drying at 120° C. for 2 hours, according to the method described in the above. The residual solvent content herein was found to be 100%, and the direction of maximum speed of sound was found to be 16.5° away from the machine direction.

The film was then dried in the drying (crystallization) process while keeping the drying temperature (surface temperature of the film) at 80° C., and upon achievement of a residual solvent content of 7%, the film was conveyed towards the third stretching process, as schematically illustrated in FIG. 1. The drying temperature was regulated by controlling the temperature of the stretching zone using a dry air.

A part of the web in the drying zone, before being brought into the third stretching process was sampled, and the residual solvent content was determined, based on a change in weight before and after drying at 120° C. for 2 hours, according to the method described in the above. Thereafter, the film was stretched at 135° C. using the pin tenter, in the direction orthogonal to the machine direction. The stretching temperature (surface temperature of the film) was regulated by control with a dry air. The stretching speed was set to 60%/min. A part of the web before being dried was sampled, and the direction of maximum speed of sound was determined. The direction of maximum speed of sound was found to be 0° away from the machine direction.

(1-4) Post Drying and Take-Up

The film after the second stretching process was further dried at 140° C. for 20 minutes.

A cellulose acylate film of 1400 mm wide and 150 μm thick was obtained in this way, and then taken up by a winder.

The thus-obtained cellulose acylate film was found to have Re of 140 nm, and the slow axis was found to be 45° away from the longitudinal direction. The direction of maximum speed of sound was 0° away from the machine direction.

Heat of fusing ΔHc was measured according to the method described in the above. Results are shown in Table below.

(3) Manufacturing of Polarizing Plate

A polyvinyl alcohol (PVA) film of 80 μm thick was dyed by dipping it in a 0.05%-by-mass aqueous iodine solution at 30° C. for 60 seconds, and then stretched five fold in length while being immersed in a 4%-by-mass aqueous boric acid solution for 60 seconds, and dried at 50° C. for 4 minutes, to thereby obtain a polarizing film of 20 μm thick.

The thus-manufactured film was dipped in a 1.5 mol/L aqueous sodium hydroxide solution at 55° C., and then thoroughly washed with water to remove sodium hydroxide. The film was then dipped in a 0.005 mol/L aqueous dilute sulfuric acid solution at 35° C. for one minute, dipped in water to thoroughly remove sulfuric acid, and then thoroughly dried at 120° C.

The thus-saponified film was pasted with a commercially available cellulose acetate film, again preliminarily saponified, while placing the above-described polarizing film in between, and while opposing the saponified surfaces, using a polyvinyl alcohol-based adhesive, to thereby obtain a polarizing plate. The commercially available cellulose acetate film used herein was Fujitac TF80UL (from Fujifilm Coporation). Since the polarizing film and the protective films disposed on both sides of the polarizing film used in this process were manufactured in the form of rolls, and since the longitudinal directions of the individual rolled films were aligned in parallel, so that the films were pasted continuously without causing wrinkle. Accordingly, the longitudinal direction (direction of casting of the film) and the absorption axis of the polarizing film were found to cross at 45°. The thus-obtained polarizing plate was denoted as a polarizing plate of Example 1.

Examples 2 to 5

The individual films were manufactured similarly as described in Example 1, except that the amount of addition of additive BB-1 was changed to the values listed in the Table below, and the polarizing plates of Examples 2 to 5 were manufactured using the individual films. All films did not cause wrinkle or other problems in the process of pasting with the polarizing film.

In Examples 2 to 5, molecule of the cellulose acylate-based compound in the amorphous state corresponds to the first molecule expressing positive intrinsic birefringence, and molecule of the cellulose acylate-based compound in the crystalline state corresponds to second molecule expressing negative intrinsic birefringence. Molecule of the cellulose acylate-based compound in the amorphous state is a major constituent of the film, and also configures the matrix.

Example 6

<Synthesis of Cyclic Polyolefin Polymer P-1>

One hundred parts by mass of purified torluene and 100 parts by mass of methyl norbornene carboxylate were input in a reaction vessel. Next, 25 mmol % (relative to mass of monomer) of ethyl hexanoate-Ni dissolved in toluene, and 0.225 mol % (relative to mass of monomer) of tri(pentafluorophenyl) boron, and 0.25 mol % (relative to mass of monomer) of triethyl aluminum dissolved in toluene were input in the reaction vessel. The mixture was allowed to react at room temperature under stirring for 18 hours. After completion of the reaction, the reaction mixture was poured into an excessive volume of ethanol, so as to precipitate a copolymer. The precipitate was purified, and the obtained copolymer (P-1) was dried in vacuo at 65° C. for 24 hours.

The composition shown below was input into a mixing tank, stirred to dissolve the individual components, and then filtered through a filter paper having an average pore size of 34 μm, and successively through a sintered metal filter having an average pore size of 10 μm.

| Cyclic Olefin-Based Addition Polymer Solution | |
| --- | --- |
| Cyclic olefin-based addition polymer P-1 | 100 parts by mass |
| p-Hydroxystyrene | 20 parts by mass |
| Oligomer *2 | 20 parts by mass |
| Methylene chloride | 400 parts by mass |
| Methanol | 50 parts by mass |

*Condensate of terephthalic acid/adipic acid/ethanediol/1,2-propanediol (0.7/0.3/1/1 by molar ratio), number-average molecular weight = 1000)

Next, the composition below, containing the cyclic polyolefin solution prepared in the above, was input in a disperser, to thereby prepare a matting agent dispersion.

| Matting Agent Dispersion | |
| --- | --- |
| Silica particle, with an average grain size of 16 nm (Aerosil R972 from Nippon Aerosil Co., Ltd.) | 2.0 parts by mass |
| Methylene chloride | 72.4 parts by mass |
| Methanol | 10.8 parts by mass |
| Cyclic olefin-based addition polymer solution | 10.3 parts by mass |

One hundred parts by mass of the cyclic olefin-based addition polymer solution and 1.35 parts by mass of the matting agent dispersion were mixed, to thereby prepare a dope for forming film.

The dope was cast through a T-die onto a mirror-polished surface of a stainless steel support. The film, having the residual solvent content fallen in the range from 15 to 25% by mass, was separated from the stainless steel support, stretched in one of the width-wise direction using a tenter, and dried under hot air at 120° C., while being held so as to not to produce wrinkle, as illustrated in FIG. 2. The film was further dried at 120° C. to 140° C., and upon achievement of the residual solvent content of 3% or below, the film was stretched again in the width-wise direction but on the opposite side as indicated by zone B in FIG. 2, to thereby obtain a film having the direction of maximum speed of sound aligned in the MD.

A polarizing plate of Example 6 was manufactured similarly as described in Example 1, except that the thus-obtained film was used. The film was successfully pasted with the polarizing film, without causing wrinkle or other problems.

Note that, in Example 6, the oligomer and p-hydroxystyrene (PHS), the both being the additives, correspond to the first molecule expressing positive intrinsic birefringence and the second molecule expressing negative intrinsic birefringence, respectively. The cyclic olefin-based addition polymer P-1 is the major constituent of the film, and the molecule thereof configures the matrix.

Comparative Example 1

Figure 3:
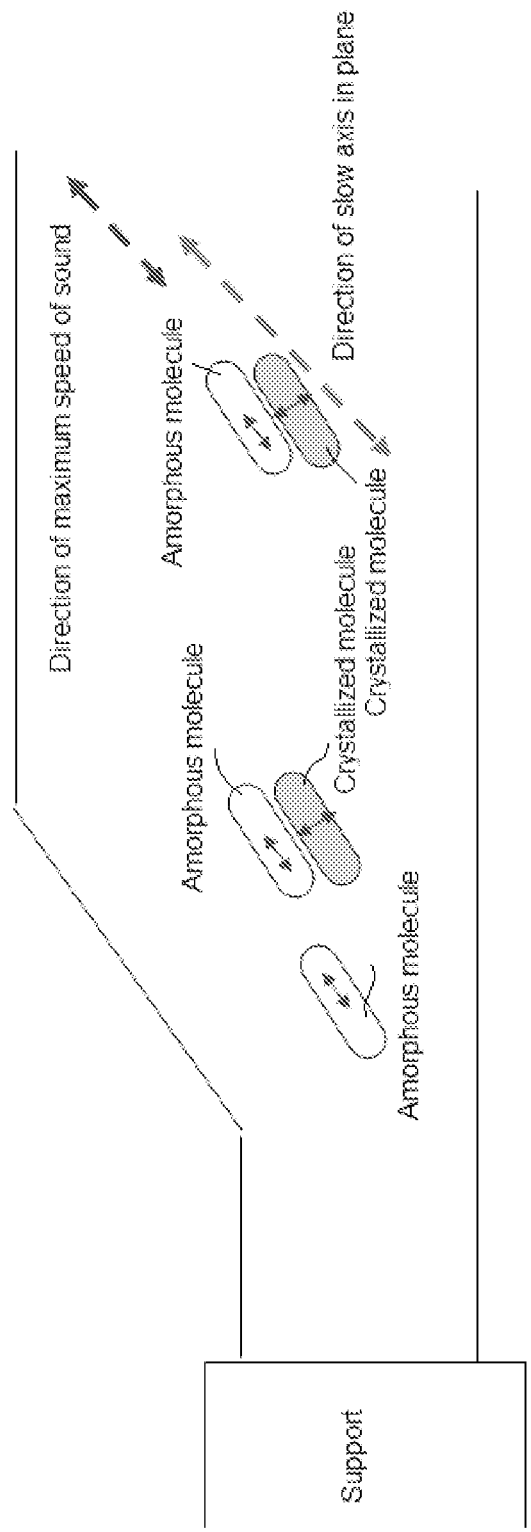
FIG. 3 is a top view schematically illustrating an exemplary scheme of a method of manufacturing a film according to Comparative Example.

The film was manufactured similarly as described in Example 1, except that the composition was altered as listed in Table below. Note that, the film was widened in the second stretching process so as to align the direction of maximum speed of sound at 45°, and then dried according to a pattern schematically illustrated in FIG. 3. In the duration where the residual volatile is 7% or more, the drying air was controlled so as not to elevate the surface temperature of the film to 80° C. or above.

Using the film, the polarizing plate was manufactured similarly as described in Example 1. The film of Comparative Example 1, however, induced stress in an oblique direction due to the oblique alignment of the polymer matrix in the processing of the polarizing plate, and produced wrinkles, which degraded the aesthetics.

Compositions, characteristics and evaluation of the workability in the process of manufacturing of the polarizing plates of Examples 1 to 6, and Comparative Example 1 are summarized in Table below. Mark "○" in the column regarding process of polarizing plate represents a good processing without causing wrinkle, and "×" represents a poor processing causing wrinkles.

In the Table, "Crystal offset angle" means the direction of alignment of crystal in the finished film, and "Pre-crystallization offset angle" means the direction of alignment of crystal in the film before the second stretching, both of which being calculated based on the degree of alignment measured by X-ray analysis. "Max/min speed of sound" corresponds to the degree of alignment, and was calculated based on ratio of maximum and minimum values of speed of sound.

TABLE 2

| | | | Example 1 | Example 2 | Example 3 | Example 4 | Example 5 | Example 6 | Comparative Example 1 |
| --- | --- | --- | --- | --- | --- | --- | --- | --- | --- |
| Composition | Matrix polymer | | TAC | TAC | TAC | TAC | TAC | P-1 | TAC |
| | Plasticizer | Type | AA-1 | AA-1 | AA-1 | AA-1 | AA-1 | オリゴマー | AA-1 |
| | | Amount of addition (parts by mass) | 10 | 10 | 10 | 10 | 10 | 20 | 10 |
| | Re inducing agent | Type | BB-1 | BB-1 | BB-1 | BB-1 | BB-1 | PHS | BB-1 |
| | | Amount of addition (parts by mass) | 3.5 | 1.0 | 2.0 | 4.0 | 2.6 | 20 | 7 |

TABLE 2-continued

|  |  |  | Example 1 | Example 2 | Example 3 | Example 4 | Example 5 | Example 6 | Comparative Example 1 |
|---|---|---|---|---|---|---|---|---|---|
|  | Angle of maximum speed of sound (direction of alignment of matrix) |  | 0 | 0 | 0 | 0 | 0 | 0 | 45 |
|  | Crystal offset angle |  | 11 | 4 | 8 | 12 | 11 | — | 45 |
|  | Pre-crystallization offset angle |  | 16.5 | 6 | 12 | 18 | 16.5 | 10 | 45 |
|  | Max/min speed of sound |  | 1.30 | 1.30 | 1.30 | 1.30 | 1.30 | — | 1.13 |
| Properties | Re | nm | 143 | 140 | 135 | 145 | 70 | 50 | 140 |
|  | Direction of slow axis in plane | ° | 46 | 12 | 30 | 51 | 35 | 30 | 45 |
|  | ΔHc | J/g | 0.1 | 0.1 | 0.1 | 0.1 | 0.1 | — | 3.5 |
|  | Film thickness | μm | 150 | 150 | 150 | 150 | 100 | 80 | 150 |
| Evaluation of wrinkle during processing of polarizing plate |  |  | ○ | ○ | ○ | ○ | ○ | ○ | X |

<Assembling in Liquid Crystal Display Device and Evaluation>

A commercially-available, 3D-compatible, VA-mode liquid crystal display device (LC-46LV3, from SHARP Corporation) was modified by replacing the front-side polarizing plate with the polarizing plates of Examples, while directing the film of the present invention on the viewer's side. Also the polarizing plate of the attached 3D glasses was replaced with the polarizing plates of the present invention. Each film of the present invention was pasted over the surface of the glasses faced to the display device, so that the slow axis of the film pasted on the display device and the slow axis of the film pasted on the glasses crossed orthogonally, when the screen was viewed through the glasses.

Video data, which contains right-eye image and left-eye image for 3D display, was input to the thus-manufactured liquid crystal display device. Observation of images on the liquid crystal display device through the attached glasses gave good stereo images, even when the head was inclined.

The present disclosure relates to the subject matter contained in Japanese Patent Application No. 088145/2011 filed on Apr. 12, 2011, which is expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A film comprising at least a first molecule expressing positive intrinsic birefringence and a second molecule expressing negative intrinsic birefringence, having a slow axis in plane in a direction which is neither parallel nor orthogonal to the longitudinal direction of the film, and which is neither parallel nor orthogonal to the individual directions of alignment of the first and second molecules.

2. The film according to claim 1, which has a maximum speed of sound in a parallel or orthogonal direction to the longitudinal direction of the film.

3. The film according to claim 1, wherein the first and second molecules are those of the same compound and exhibit positive-negative inverted intrinsic refractive indices based on difference in the degree of crystallization.

4. The film according to claim 3, wherein the first molecule is a molecule of cellulose acylate-based compound in an amorphous state, and the second molecule is a molecule of cellulose acylate-based compound in a crystalline state.

5. The film according to claim 1, wherein the first and second molecules each are molecules of additives, and the film further comprises, as a major constituent, a polymer expressing positive or negative intrinsic birefringence.

6. The film according to claim 1, having a retardation in plane Re(550) at 550 nm of λ/4.

7. The film according to claim 1, having a slow axis in plane in a direction which is 45° away from the longitudinal direction or from the direction of maximum speed of sound.

8. A polarizing plate comprising a polarizing film and the film according to claim 1.

9. The polarizing plate according to claim 8, wherein the absorption axis of the polarizing film and the slow axis in plane of the film cross at 45°.

10. A display device having at least the film according to claim 1.

11. The display device according to the claim 10, which has the polarizing plate according to claim 8.

12. A method of manufacturing the film according to claim 1, comprising:
   obtaining a film comprising a first molecule expressing positive intrinsic birefringence and a second molecule expressing negative intrinsic birefringence, both of the first and second molecules being aligned in a first direction; and
   aligning, while keeping one of the first and second molecules aligned in the first direction, the other molecule in a second direction.

13. The method according to claim 12, further comprising, after obtaining the film and before aligning the other molecule, adjusting at least one condition affective to alignability of the first molecule and the second molecule.

14. A method of manufacturing the film according to claim 1, comprising:
   obtaining a film comprising a molecule in an amorphous state, the molecule in an amorphous state being aligned in a first direction;
   allowing a part of the molecule in an amorphous state aligned in the first direction to crystallize, so as to change it into a molecule in a crystalline state having an intrinsic birefringence with a sign opposite to a sign of the intrinsic birefringence of the molecule in an amorphous state; and
   allowing the molecule in a crystalline state to align in a second direction, while keeping the direction of alignment of the molecule in an amorphous state in the first direction.

15. A film comprising at least a first molecule expressing positive intrinsic birefringence and a second molecule expressing negative intrinsic birefringence, and having a slow axis in plane in a direction which is neither parallel nor orthogonal to the direction of maximum speed of sound.

16. The film according to claim 15, wherein the first and second molecules are those of the same compound and exhibit positive-negative inverted intrinsic refractive indices based on difference in the degree of crystallization.

17. The film according to claim 15, wherein the first molecule is a molecule of cellulose acylate-based compound in an amorphous state, and the second molecule is a molecule of cellulose acylate-based compound in a crystalline state.

18. The film according to claim 17, wherein the first and second molecules each are molecules of additives, and the film further comprises, as a major constituent, a polymer expressing positive or negative intrinsic birefringence.

19. The film according to claim 15, having a retardation in plane Re(550) at 550 nm of $\lambda/4$.

20. The film according to claim 15, having a slow axis in plane in a direction which is 45° away from the direction of maximum speed of sound.

\* \* \* \* \*